United States Patent Office 2,837,370
Patented June 3, 1958

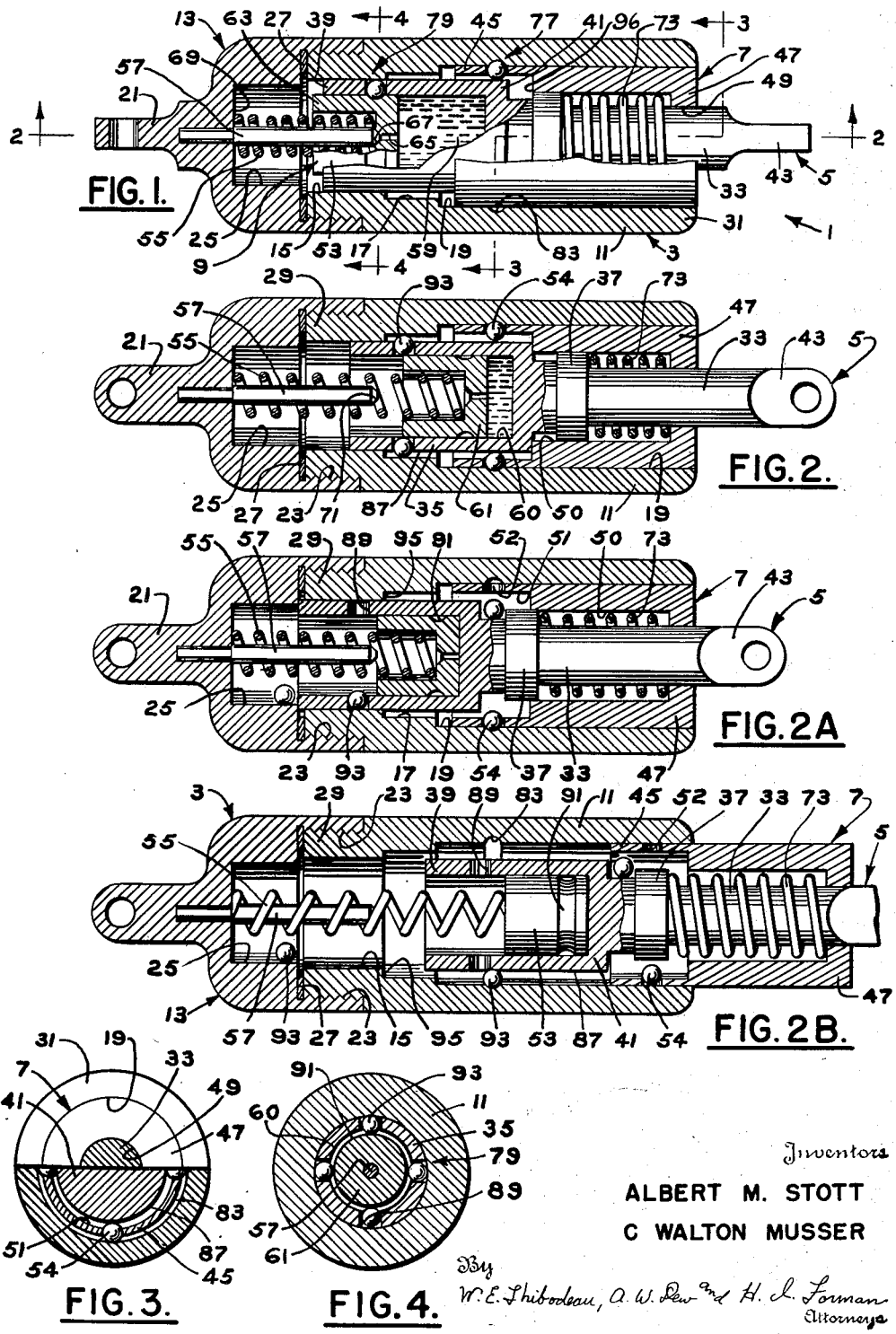
June 3, 1958    A. M. STOTT ET AL    2,837,370
RELEASABLE COUPLING
Filed Nov. 30, 1955
Inventors
ALBERT M. STOTT
C WALTON MUSSER

2,837,370

RELEASABLE COUPLING

Albert M. Stott, Clifton Heights, and C Walton Musser, Levittown, Pa., assignors to the United States of America as represented by the Secretary of the Army Application November 30, 1955, Serial No. 550,227

5 Claims. (Cl. 294—83)

(Granted under Title 35, U. S. Code (1952), sec. 266)

The invention described herein may be manufactured and used by or for the Government for governmental purposes without the payment of any royalty thereon.

The present invention relates to coupling apparatus and more particularly to a coupling for connecting two members together and subsequently automatically releasing them for separation.

Release devices of the kind to which the present invention is directed find suitable application in the delivery of cargo by parachute from an airplane carrier. In situations of this kind, it is found expedient to provide an apparatus which will couple the cargo to a parachute for the purpose of retarding the force of gravity acting thereon in the descent from the carrier to the ground and which will release the cargo automatically from the parachute almost instantaneously once it is deposited on the ground. Instantaneous release of the cargo precludes the possibility of the parachute dragging the cargo along the ground and consequent damage thereto.

Prior art release devices of the kind above referred to have been found unreliable primarily for the reason that they unlock prematurely and inadvertently drop the load in mid-air causing it to crash on the ground. This condition is particularly encountered immediately after the load is dropped from the carrier at the instant when the parachute opens causing the shroud lines to snap in such manner as to momentarily release the mechanism in the same manner in which it is intended to operate once the load is deposited upon the ground.

A primary purpose of the present invention is to provide an improved coupling which will automatically release the members which it connects.

Another object of the present invention is to provide an improved coupling which is positive in operation, simple in structure and highly efficient in use.

Still another object of the present invention is to provide an improved release device which will overcome the above disadvantages as well as other disadvantages of similar prior art devices.

A further object of the present invention is to provide a release device which will prevent premature release of the members which it connects.

Still further, it is an object of the present invention to provide a release device which is particularly suitable for use in delivering cargo by air carrier to a ground location.

In accordance with the present invention, the releasable coupling comprises at least three telescoping members, the outermost and innermost ones of which are adapted for attachment to two objects to be connected as long as opposing forces acting upon the objects respectively tend to separate them. A locking arrangement is provided for normally preventing separation of the members. The locking arrangement is responsive to the action of the forces upon the connected objects and functions to condition the coupling for separation upon initial application of the forces applied to the objects in opposite directions. Means are provided for preventing further unlocking of the coupling until the lapse of a predetermined time interval to prevent premature release by the coupling. After the time period has elapsed, the locking arrangement is responsive upon release of the forces acting on the objects to complete the release of the telescoped members thereby disconnecting the objects.

The normal features characteristic of the present invention, as well as additional objects and advantages thereof, will be understood better from the following detailed description when read in connection with the accompanying drawing in which:

Figure 1 is a central, longitudinal section of a preferred embodiment of the present invention showing the parts in normal assembled relation, certain elements thereof being shown partly in elevation and partly broken away;

Figure 2 is a view, similar to Figure 1, rotated 90 degrees therefrom, showing the relation of parts at an interim stage after application of load to condition the device for subsequent release;

Figure 2A is a view, similar to Figure 1, showing the relation of parts at a stage wherein the parts have assumed a full release position in which they are conditioned for complete separation; the fluid medium not being shown in this view;

Figure 2B is a view, similar to Figure 1, but showing the parts in a position subsequent to that shown in Figure 2A and just prior to complete separation thereof; the fluid medium not being shown in this view;

Figure 3 is a sectional view, taken along the line 3—3 of Figure 1, showing details of structure with respect to the catch detent; and Figure 4 is a sectional view, taken along the line 4—4 of Figure 1, showing further details of structure with respect to the piston detent.

Referring more particularly to the drawing, wherein similar reference characters are used to designate corresponding parts throughout, the release device 1 is shown as an adaptation suitable for use as a coupling for equipment employed to deliver cargo by parachute from an airborne carrier. The release device or coupling member is utilized to attach the parachute to the cargo thereby to control the descent of the cargo until it is deposited safely upon the ground.

The releasable coupling 1 is a composite unit of at least three telescoping members and comprising, generally, a housing 3, a release pin 5, a catch 7 and a time delay mechanism 9.

The housing 3 or outermost member is a hollow cylindrical piece or coupling member consisting of a main body portion 11 and a cap or end closure member 13. The main body portion is cylindrical throughout its length. The interior wall of the main body portion is provided with a stepped bore divided into three sections 15, 17, 19 each of different uniform diameter for purposes which will become evident from description presented subsequently herein. The three sections are disposed in the order of increasing diameter from one end of the body portion to the other end.

The cap 13 is provided as a closure member for the end of the body portion having the smallest diameter inner wall section 15. The cap is generally cylindrical and is provided with an apertured extension 21 exteriorly and axially thereof. The extension is of a design which is found suitable and convenient for attaching thereto the cargo to be carried. Complementary thread engaging portions 23 are provided on both the cap and the body portion for convenience in securing the cap to the body portion as well as to facilitate assembly and disassembly of the coupling unit. An axial bore 25 is provided in the end of the cap opposite that carrying the apertured extension 21 which is intended for communication directly with the smallest diameter bore 15 of the housing body portion. An annular gasket 27 is provided as a seal between the cap and body portion. The diameter of the axial bore 25 is smaller than that of the adjacent housing bore 15 for a purpose which will be apparent from later description. Thus, the main body portion of the housing is closed at one end 29 by the cap 13 and the other end 31 remains open to permit withdrawal of the telescoped members contained therein.

The release pin or innermost member 5 comprises a second coupling member having a solid cylindrical portion 33, a hollow cylindrical portion 35 and an annular collar or shoulder portion 37. The hollow portion is of larger diameter than the solid portion and is coaxial therewith extending from one end thereof. The external diameter of the hollow portion is substantially equal to the internal diameter of the smallest bore section 15 of the housing and is arranged for slidable movement axially therein. The length of the hollow portion is such that, with the open end 39 thereof disposed substantially entirely within the smallest diameter section 15 of the housing, as shown in Figure 2A of the drawing, the opposite closed end 41, which is attached to the solid portion 33, extends beyond the intermediate diameter housing section 17 into the larger diameter housing section 19. The solid cylindrical portion 33 of the release pin extends from the hollow portion 35 out beyond the open end of the housing main body portion 3. The outwardly extended end portion 43 is apertured and designed for convenience in attaching a parachute thereto whereby the entire apparatus serves as a coupling between the cargo and the parachute. The annular collar or shoulder portion 37 is disposed on the solid portion a short distance from the hollow portion closed end 41. The purpose of this collar portion will appear from description presented subsequent hereto.

The catch or intermediate member 7 is a hollow cylindrical piece having a two section stepped bore. One end 45 of the catch is open and the opposite end 47 is closed except for an axial aperture 49 which extends therethrough. The external diameter of the catch is uniform and substantially equal to the largest diameter bore 19 of the housing main body. The catch is freely slidable within the housing largest diameter section and extends substantially throughout the length of that section in the normal coupling position. The small bore section 50 of the catch is disposed adjacent to the catch closed end 47 and accommodates the release pin solid portion 33 together with the associated collar portion 37. The collar portion 50 and the catch small bore section are of substantially the same diameter and are constructed in a manner as will permit relative slidable movement therebetween. Thus, the catch small bore section functions as a bearing surface for the solid end portion of the release pin. The large bore section 51 is disposed adjacent to the open end 45 and is of a diameter greater than that of the release pin hollow portion 35. At least three detent receiving openings 52 are provided in the cylindrical wall of the catch within each one of which a ball detent 54 is disposed. The openings are uniformly spaced apart at equal distances from and adjacent to the open end 45 of the catch.

The time delay mechanism 9 comprises a mechanical safety arrangement in the form of a dashpot and employing a piston 53, a compression spring 55, a valve stem 57, and a fluid medium 59. The cylinder which defines the chamber 60 for the piston 53 is provided by the hollow cylindrical portion 35 of the release pin 5. The piston 53 is a hollow cylindrical member having a closed end 61 and an open end 63. The closed end is provided with an aperture or bleeder opening 65 disposed axially therethrough to communicate the hollow interior of the piston with the chamber 60. The piston wall portion 67 defining the internal end of the opening is tapered to accommodate the valve stem 57.

The valve stem 57 is a solid cylindrical member which is supported by the end cap 13. The valve stem is disposed to extend in an axial direction from the bottom 69 of the end cap bore 25 to a point substantially coextensive with the threaded end of the cap. The free end 71 of the stem is tapered to correspond with the tapered portion 67 of the piston aperture 65.

Referring now to Figure 1 of the drawing, wherein the coupling elements are illustrated in a fully assembled relation ready for attachment between an item of cargo and a parachute, the main body portion 11 is shown with the end cap 13 threadedly engaged thereon. The annular gasket 27 is disposed between the threaded end of the main body portion and the end cap thereby to properly seal that end of the housing. The catch 7 is disposed entirely within the largest diameter bore of the main body portion 11 so that it is substantially flush with the open end 31 of the housing 3. The release pin 5 is disposed to extend axially through the catch 7 with the solid cylindrical portion 33 thereof extending through the opening 49 in the closed end 47 of the catch. The hollow cylindrical portion 35 of the pin extends from the solid portion thereof and from within the catch large diameter bore 51 beyond the catch open end 39, through the intermediate diameter bore 17 of the housing and into the small diameter bore 15 of the housing. Since the annular collar 37 of the pin is slidably accommodated within the small diameter bore 50 of the catch, the release pin 5 is supported for movement axially relative to the housing by the collar 37 and by the open end 39 of the hollow portion disposed within the housing small bore section.

A compression spring 73 is provided to facilitate release of the pin 5. This spring is disposed to encompass the solid cylindrical portion 33 of the pin and is located within the small diameter bore 50 of the catch between the annular collar 37 and the closed end 47 of the catch.

The piston 53 is supported for slidable movement axially within the chamber 60 provided by the hollow cylindrical portion 35 of the release pin. The piston is arranged with the open end 63 thereof directed toward the open end 39 of the release pin hollow portion and toward the cap or end plate 13. In the normal position of the piston, a fluid medium 59 fills the release pin chamber 60. Any suitable fluid may be used which will permit the piston to function as a dashpot. The viscosity of the fluid and the size of the bleeder opening 65 should be selected according to the required interval of delay desired. The tapered end 71 of the valve stem is seated within the tapered portion 67 of the piston bleeder opening 65 thereby to prevent the fluid from escaping through the opening. The compression spring 55 encompasses the valve stem and is disposed with one end thereof within the piston hollow interior and bearing against the closed end 61 thereof and the bottom 69 of the cap bore 25.

For the purpose of locking the members in place prior to operation of the device to release the parachute from the cargo, two detent or locking arrangements 77, 79 are provided. The one locking arrangement 77 is provided as a means for holding the catch 7 in its assembled position within the housing. This arrangement is provided by the detent openings 52 through the wall of the catch adjacent to the open end 45 thereof. An annular groove 83 is provided in the interior wall of the housing defining the large diameter bore 19 at points opposite the catch openings 52 when the catch is arranged in its normal assembled position within the housing. A plurality of ball detents 54 are disposed within the catch openings which are engaged within the annular housing groove 83 and are held in place by that portion of the external surface 87 of the release pin hollow portion.

The other locking arrangement 79 is provided both as a means for holding the piston against movement relative to the pin hollow portion 35 and also as a means for temporarily limiting movement of the release pin. This arrangement is provided by a plurality of openings 89 through the wall of the hollow portion adjacent to the open end thereof. An annular groove 91 is provided in the external surface of the piston adjacent to the closed end 61 thereof. A plurality of ball detents 93 are disposed within the release pin openings 89 which are engaged within the annular groove 91 of the piston and are held in place by the housing wall defining the small diameter bore 15. Thus, the piston 53 is secured against movement relative to the release pin 5 and the catch 7 is secured against movement relative to the housing, that is, in the normal position of the parts prior to application of opposing forces to the coupling.

The operation of the coupling device in the delivery of cargo to a ground location by parachute is in the following manner. Upon release of the load from the carrier the load will descend first under influence of the force of gravity followed by the parachute. As the parachute opens to check the descent of the load, the counteracting force brought about by capture of air in the parachute will cause the parachute to pull upwardly upon the release pin 5 to which it is attached. At the same time, the load will continue to pull downwardly on the cap 13 and housing 3 with the result that the opposing forces will effect a partial withdrawal of the release pin against the influence of the release spring 73. Withdrawal of the release pin will be checked by the internal shoulder 96 defining the step between the two bores of the catch engaging the closed end 41 of the release pin hollow cylindrical portion 35, as shown in Figure 2 of the drawing. This partial withdrawal initiates two actions, namely: (1) the piston 53 is moved along with the release pin considering its locked engagement therewith by reason of the locking detent 79 thereby moving the tapered portion 67 of the piston bleeder opening 65 from the tapered end 71 of valve stem 57 and opening the passage provided by the bleeder aperture 65; and (2) the ball detents 93 are moved beyond the limits of the housing smallest diameter bore 15 into the area defined by the intermediate diameter bore 17 in which position they are free to move radially outwardly.

The piston detents 93 having been partially released are then moved radially outwardly by the piston 53 under the influence of the compression spring 55 associated therewith. The piston being free to move will be forced into the chamber of the release pin cylindrical portion 35 in accordance with the rate of escape of the fluid medium 59 through the bleeder opening in the manner of a dashpot action. Once the release pin releases the piston, the delay occasioned by the dashpot arrangement is sufficient to permit the parachute to adjust itself to sudden impact conditions in checking the descent of the load to effect a relatively smooth action wherein the weight of the load constantly pulls downwardly on the parachute. This constant pull downwardly is sufficient to prevent further release action taking place until the load is deposited on the ground. However, if for some reason, there should be a momentary release of the opposing forces acting on the coupling during the initial adjusting period and prior to the completion of travel of the piston to release the detents for transverse movement inwardly, the release pin is prevented from moving sufficiently under the influence of the release spring 73 to release the catch detents 54. In such case, the release pin movement is checked by the ball detents 93 engaging the shoulder 95 defined by the step between the small and intermediate bores of the housing in view of the piston not having cleared the detent openings 89 sufficiently to allow transverse movement inwardly of the ball detents 93. Thus, premature release of the load by the coupling is prevented until after the interval of time has elapsed which will clear the release pin detent openings.

Once the load is deposited on the ground, the forces tending to separate the release pin from the housing are relieved. Since the compression release spring 73 is designed to impart a stronger load than the piston spring 55, it will influence the release pin inwardly into the housing. As the release pin is pushed back into the housing, the hollow cylindrical portion 35 thereof passes beyond the area of the catch detent locking arrangement 77. Because of the reduced diameter of the solid cylindrical portion 33 from that of the hollow portion, the ball detents 54 are no longer held within the openings 52 and the annular groove 83 but are free to move radially inwardly. Thus, the catch 7 is no longer locked against movement relative to the housing 3 by the locking arrangement 77. Being free to move, the catch is influenced outwardly from the housing by the action of the release pin compression spring 73 or by any force tending to separate the release pin from the housing. In other words, both detent locking arrangements 77, 79 no longer prevent separation of the three telescoping members.

From the foregoing description, it should be apparent to persons skilled in the art that the present invention provides a release device which is simple and positive in operation and which can be relied upon to greatly minimize, if not entirely eliminate, premature release of two coupled members. Although the present invention has been shown and described herein with respect to a single, preferred embodiment, it should be obvious to those persons skilled in the art that various changes and modifications are possible within the spirit of the invention. For example, the viscosity of the fluid or the size of the bleeder opening may be varied to effect any desired time interval or the means for attaching the coupling to the objects to be connected together may be changed without departing from the spirit of the invention. Other changes of like nature are possible within the spirit of the present invention. Therefore, it is desired that the particular form of the present invention described herein be considered as illustrative and not as limiting.

We claim:

1. A releasable coupling device for maintaining two objects connected together as long as opposing forces acting respectively upon said objects tend to separate them, said device comprising three telescoping members, an outer member, an intermediate member and an inner member, the outer member being hollow and provided with coupling means on one end thereof for attaching a first one of the objects thereto, the opposite end of said outer member being open, the intermediate member and the inner member being disposed within said outer member for slidable movement relative thereto and separable therefrom through said open end thereof, said inner member being provided with coupling means on one end thereof for attaching a second one of the objects thereto, a first locking means carried by said intermediate member for movement transversely relative thereto, a portion of said inner member being in contact with said first locking means normally to maintain said first locking means engaged with said outer member thereby to hold said intermediate member against movement relative to said outer member, means carried by said inner member for moving said inner member relative to said outer and said intermediate members in a direction opposing movement to separate said members, said movement causing means being effective in response to both application and release of the opposing forces acting upon the objects, said inner member portion being so disposed and arranged as to release said first locking means in response to movement of said inner member by said movement causing means sufficiently to release said intermediate member from said outer member thereby to effect separation of all of said members from each other.

2. The invention as defined in claim 1 and wherein said device includes means carried by said inner member for retarding action of said movement causing means, said retarding means being operative in response to application of the opposing forces to the objects and being disposed to limit movement of said inner member by said movement causing means for a predetermined interval of time thereby to prevent monmentary release of said members immediately following application and partial release of the opposing forces to the objects.

3. The invention as defined in claim 2 wherein said retarding means comprises dashpot means including a hollow end portion of said inner member disposed at the end opposite said one end thereof, a piston disposed within said hollow end portion having a bleeder opening of predetermined size, said piston being disposed for slidable movement within said hollow portion normally from said opposite end toward said one end, and means in contact with said piston for effecting movement thereof.

4. The invention as defined in claim 3 wherein said means for effecting movement of said piston comprises pressure means disposed between said piston and said outer member, a second locking means carried by said inner member hollow portion and disposed for movement transversely relative thereto, a portion of said outer member being in contact with said second locking means normally to maintain said second locking means engaged with said piston thereby to hold said piston against movement within said hollow portion, and means disposed for engagement with said piston to close said bleeder opening in the locked position of said piston, said second locking means and said bleeder closing means being responsive to application of the opposing forces to the objects both to effect release of said piston for movement under influence of said pressure means and to disengage said closure means from said piston thereby to open said bleeder opening.

5. A releasable coupling device having at least three telescoping members, comprising an outermost member fixed to a load support, an intermediate member and a load supporting innermost member, a first locking means holding said intermediate and outermost members together, said locking means being held in place and slidable on said innermost member, said intermediate member provided with an abutment shoulder to limit the outward movement of said innermost member upon the application of a load, a mechanical delay means disposed within said innermost member comprising a fluid and a piston, resilient means for biasing said piston against said fluid, said delay means having a period in excess of the time of rebound of a load due to elasticity of a connection to one of said load supports, a second locking means holding said piston from movement prior to the application of a load, said outermost member having an inner intermediate counterbore so that said second locking means has limited movement in a radially outward direction thereby releasing said piston while at the same time limiting the inward movement of said innermost member until said delay means has substantially fully acted, a resilient means between said intermediate and innermost members to resiliently force the innermost member inward after said delay means has substantially fully acted and an applied load finally released, thereby releasing said first locking means to effect unlocking of said intermediate and outermost members enabling said biasing and resilient means to eject said innermost and intermediate members.

References Cited in the file of this patent

UNITED STATES PATENTS

| 2,534,704 | Frieder et al. | Dec. 19, 1950 |
| 2,562,459 | Hoey | July 31, 1951 |
| 2,693,980 | Heidman | Nov. 9, 1954 |
| 2,729,495 | De Jean | Jan. 3, 1956 |